(12) United States Patent
Yang et al.

(10) Patent No.: US 8,833,347 B2
(45) Date of Patent: Sep. 16, 2014

(54) AUTOMATICALLY REGULATED GASEOUS MIXER FOR SMALL UNIVERSAL GAS ENGINE

(76) Inventors: Huachang Yang, Shanghai (CN); Hao Wu, Shanghai (CN)

( * ) Notice: Subject to any disclaimer, the term of this patent is extended or adjusted under 35 U.S.C. 154(b) by 329 days.

(21) Appl. No.: 13/314,588

(22) Filed: Dec. 8, 2011

(65) Prior Publication Data

US 2012/0125299 A1  May 24, 2012

Related U.S. Application Data

(63) Continuation-in-part of application No. 12/678,416, filed on Mar. 16, 2010, now abandoned.

(30) Foreign Application Priority Data

Mar. 6, 2008  (CN) .................. 2008 2 0055971 U

(51) Int. Cl.
| | |
|---|---|
| *F02B 43/00* | (2006.01) |
| *F02M 23/00* | (2006.01) |
| *F02B 47/08* | (2006.01) |
| *F02M 21/04* | (2006.01) |

(52) U.S. Cl.
CPC ................ *F02M 21/04* (2013.01); *Y02T 10/32* (2013.01)
USPC .. 123/527; 123/27 GE; 123/525; 123/568.15; 123/568.18; 123/568.19; 123/586; 123/590; 123/306; 123/337; 123/437; 123/585; 123/556; 123/516; 123/179.14; 261/44.2

(58) Field of Classification Search
CPC ............. F02M 7/24; F02M 9/08; F02M 9/02; F02M 17/10
USPC ................ 123/27 GE, 525, 527, 586, 568.15, 123/568.18, 568.19, 590, 306, 337, 437, 123/585, 556, 516, 179.14; 261/44.2
See application file for complete search history.

(56) References Cited

U.S. PATENT DOCUMENTS

| | | | | |
|---|---|---|---|---|
| 1,857,889 | A | * | 5/1932 | Sturm .......................... 261/72.1 |
| 2,538,559 | A | * | 1/1951 | Egerer ............................ 261/62 |
| 2010/0176519 | A1 | * | 7/2010 | Omarsson et al. ........... 261/44.2 |
| 2010/0192926 | A1 | * | 8/2010 | Yang et al. .................... 123/527 |

* cited by examiner

*Primary Examiner* — Lindsay Low
*Assistant Examiner* — Tea Holbrook
(74) *Attorney, Agent, or Firm* — Houtteman Law LLC

(57) ABSTRACT

This invention relates to an automatically regulated gaseous mixer for small universal gas engine comprising a mixer body, a choker, an air inlet port, a main gas passage, a main metering jet, a mixture outlet port, a throttle valve, a gas connecting passage and an auxiliary gas passage, which is characterized in that an auxiliary gas passage is set parallel to the main gas passage and connected through a vertical gas passage. Its top end is linked to the main gas passage and the lower end is connected with the auxiliary gas passage, one end of the auxiliary passage is connected with the mixture outlet port. The shaft of throttle valve is in line with auxiliary gas passage and is extended into the auxiliary gas passage to form an automatically regulated valve. The advantages of this invention are simple and compact; practical and reliable.

2 Claims, 5 Drawing Sheets

AUTOMATICALLY REGULATED GASEOUS MIXER FOR SMALL UNIVERSAL GAS ENGINE

TECHNICAL DOMAIN

Figure 1:
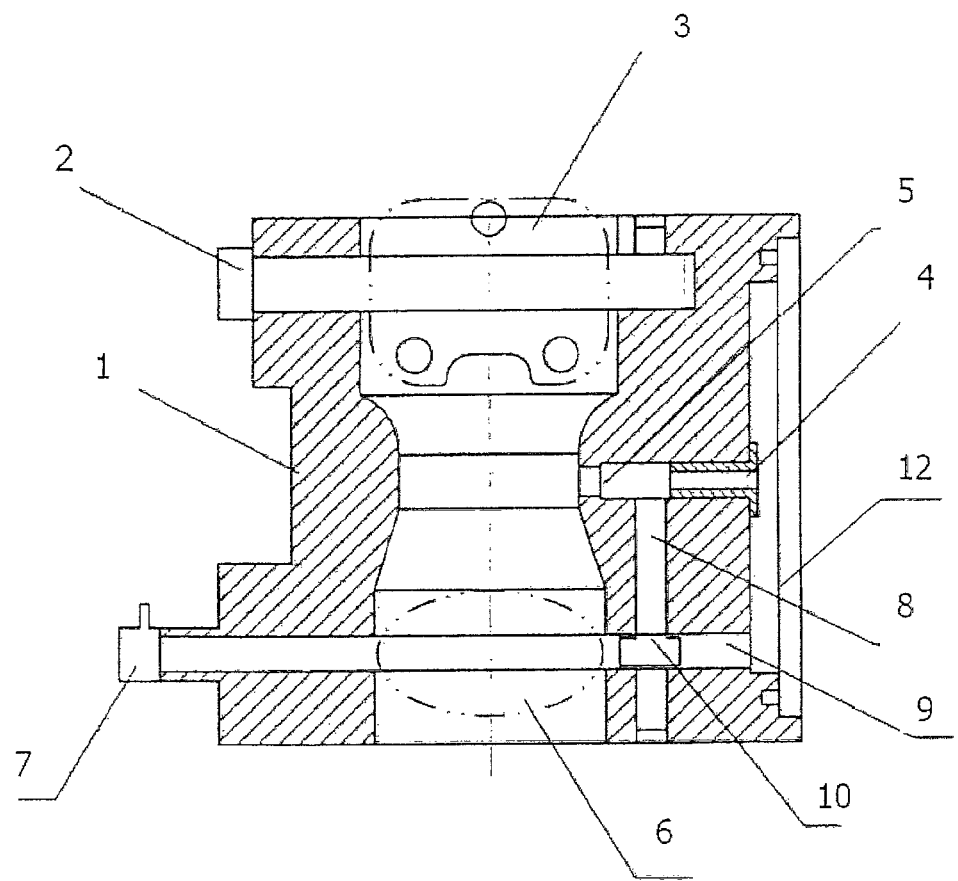

This invention relates to a gaseous mixer capable of automatically regulating the air/fuel mixture for small universal gas engine, which is typically used on portable applications such as electricity generator sets, water pump, lawn mower, rotary cultivate machine and other mobile equipment used for domestic, agriculture, industrial construction, and off-road vehicle, etc. The technical domain of the invention is in the field of mixture regulating mechanism of gas engines.

TECHNICAL BACKGROUND

The machinery manufacturing industry possesses a unique advantage in China. Joining the WTO has provided a great opportunity for Chinese-made products entering into the global markets, particularly the small universal gas engine which is powered by gaseous fuels such as natural gas, LPG or Biogas. The applications for engines with its capacity less than 19 kW have been developed rapidly. This type of engines are commonly used on portable devices such as small generator sets, high-pressure cleaner, lawn mower and water pumps, etc.

There are specific technical challenges on such applications. Firstly, the operating condition of the engine is subject to larger range of variations comparing to automotive engine whose operating condition is usually stable and predictable. Secondly, the fuel supply is usually in gaseous state (such as output from domestic LPG bottle or NG pipeline) rather than liquid state. The seal methods become more critical for gaseous mixer because the air/fuel ratio will be changed if air is sucked into the fuel passage or gas leaks out of the passages. The ambient temperature and gas supply pressure are subject to change from time to time, hence the metering method for controlling the amount of gas entering into the mixer is different from liquid fuel. The prior technology and control mechanism that were used on liquid fuel may not be suitable for such application (such as the mechanism described in U.S. Pat. No. 3,224,425). Thirdly, the engine is usually supplied as a general power unit to the third-parties such as the manufacturers of generator sets, high-pressure cleaner, lawn mower and water pump, etc. However, for different devices, the required engine characteristics of its torque or performance curve are different. Therefore, there is a need for some convenient ways for the engines to achieve different performance curve without significant structural changes to suit various applications. Further, due to the nature of the small size and the cost constraint, the advanced ECU-based control system is usually too expensive to be feasible on such applications.

Due to the nature of small universal gas engine, a specially-designed gaseous mixer is required to properly control the mixture ratio of air and gas according to different operating conditions. Currently the gaseous mixer for small universal gas engine usually consists of a mixer body, a choker, an air inlet port, a gas passage, a main metering jet, a mixture outlet port, a throttle valve, a main passage and an auxiliary passage. The air from the air inlet port is mixed with the gas coming from the main metering jet to form a combustible gaseous mixture. The performance of the gaseous mixer varies with the load of the engine and the concentration of the combustible gaseous mixture should vary accordingly. However, the present gaseous mixers only have one gas passage for fuel supply and thus the fuel amount cannot be adjusted according to the engine load. The inability of adjusting the gaseous mixture to the engine performance results in the improper work of engine. A common problem is that the gaseous mixture is too rich and thus causes an improper working condition for engine, such as difficulty to start up, fluctuation of rotary speed under idling or partial load conditions, flareback at mixer and back fire in exhaust pipe, etc.

The prior art, U.S. Pat. No. 322,445, disclosed a device structure for automatic adjustment of liquid fuel and air according to engine operating condition by means of a crank linkage device with structure extending outwardly through the wall of carburetor. Another prior art, U.S. Pat. No. 3,365,179, disclosed a carburetor of automatic adjustment in fuel and air and the secondary air valve is actuated by venturi or manifold pressure. Such control mechanism will not be functioning for gaseous engines and essentially different to the proposed invention.

SUMMARY OF THE INVENTION

This invention is aiming to design an automatically regulating gaseous mixer for small universal gas engine. To achieve the above-mentioned objectives, the technical focus of this invention is to propose an integrated control mechanism capable of automatically regulating the mixture ratio based on engine's load level. The proposed gaseous mixer consists of a mixer body, a choke valve, an air inlet port, a gas passage, a main metering jet, a mixture outlet port, a throttle valve, a main gas passage, an auxiliary gas passage whose cross-section area can be automatically adjusted with the throttle valve. The air inlet port is located on the upper end of the body housing, the choke valve is fitted in the downstream of the air inlet port, the main gas passage is connected from one side of the body housing and fitted with the main metering jet to gauge the maximum gas quantity entering into the engine. The mixture outlet is located at the bottom of the body housing. This invention proposes an auxiliary gas passage parallel to the main gas passage and connected through a vertical gas passage. Its top end is linked to the main gas passage and the lower end is connected with the auxiliary gas passage. The shaft of throttle valve is in line with auxiliary gas passage and is extended into the auxiliary gas passage to form an automatically regulated valve. This arrangement play an important role because the intersection of the shaft and vertical gas passage form a variable-size orifice to control the auxiliary gas amount blended into the main gas passage. The cross-sectional profile of the shaft can be cut as semi-arc, oval, circular or rectangular shape.

The key feature here is its capability to effectively handle gaseous fuels to automatically control the required air/fuel mixture ratio under different operating conditions through a simple yet reliable mechanism. More importantly, the whole control mechanism is embedded inside the mixer body and can effectively avoid the leaking issues, which otherwise would be difficult if the control linkage device is outside of the mixer body.

In this invention an auxiliary passage is added to the original gas passage, and thus the whole gas passage is divided into two parts, the main gas passage and the auxiliary gas passage, those two passages converge at one fuel channel in front of the throat outlet, there is a main metering jet in the main gas passage, and the shaft of throttle valve is extended into the auxiliary gas passage to form a gas automatically regulating valve, The gas automatically regulating valve is the key component and the shaft of throttle valve can be served as a mechanical governing system. to adjust the gas flow in the auxiliary gas passage this invention can make the optimization of concentration of combustible gaseous mixture to suit all load conditions of small universal gas engine, some abnormal phenomenon such as fluctuation of rotary speed, hardly start up, flareback at mixer, back fire in exhaust pipe and unreachable to maximum load etc. will be avoided.

The selection of different profiles of round, oval or square shapes is depended on the optimized matching to the output performance curves of the engine, which means the optimized air/fuel ratio can be maintained in various load level of engine. Further, to change both the profile of the auxiliary passage and the gas automatically regulating valve can easily meet the requirement of different load and to ensure the sufficient power output and meanwhile to keep the emission in flue gas much lower than that of the value stipulated in EPA.

The regulative mechanism of this invention is embedded inside of mixer housing, the gas regulative valve and the throttleshaft are integrated into one body, apparently avoided ambient air being sucked in or gas leaking out, thus a accurate control of air/fuel ratio can be ensured.

The advantages of this invention can be summarized as: simple and compact; practical and reliable; the achievement of automatic regulation of gas mixture.

DESCRIPTION OF DRAWING ATTACHED

Figure 2:
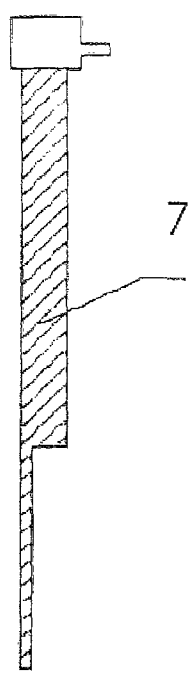
Figure 3:
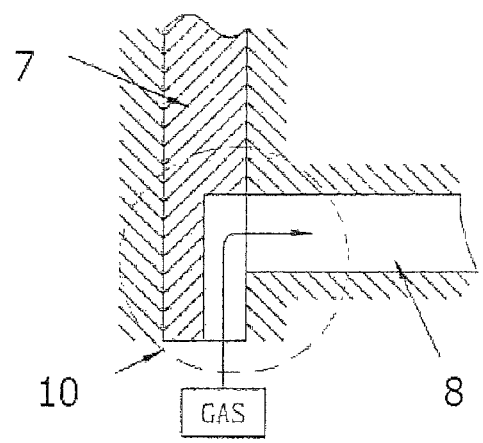
Figure 4:
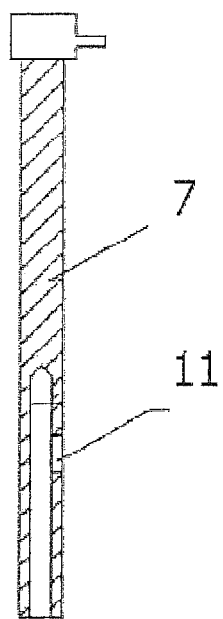
Figure 5:
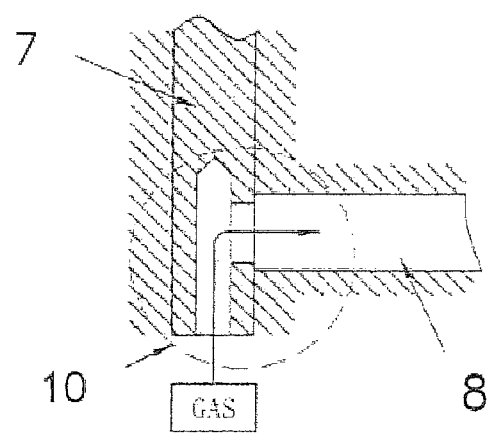

FIG. 1 is a sketch for the automatically regulated gaseous mixer for small universal gas engines FIG. 2 is a sketch for the shaft of throttle valve of this invention FIG. 3 is a sketch for the gas automatically regulated valve formed by the shaft of throttle valve and the passage FIG. 4 is a sketch for the shaft of throttle valve of this invention with different structure FIG. 5 is a sketch for the gas automatically regulated valve formed by the shaft of throttle valve and the passage according to FIG. 4

DETAILED DESCRIPTION OF THE EXAMPLE EMBODIMENTS

As shown in FIG. 1, an automatically regulated gaseous mixer for small universal gas engine consists of the mixer body 1, the choke valve 2, the air inlet port 3, the gas passage 4, the main metering jet 5, the mixture outlet port 6, the throttle valve 7, the gas connecting passage 8, and the auxiliary gas passage 9.

The air inlet port 3 is located on the upper end of the air inlet body housing 1, the choke valve 2 is fitted in the downstream of air inlet port 3, the main gas passage 4 is connected from one side of the body housing 1, and fitted with the main metering jet 5 to gauge the maximum gas flow entering into the engine. The mixture outlet port 6 is located at the lower end of the body housing 1.

The auxiliary gas passage 9 is fitted between the main gas passage 4 and the mixture outlet 6 and is also parallel to the main gas passage 4, and the gas connecting passage 8 is to link the auxiliary gas passage 9 and the main gas passage 4. The shaft of throttle valve 7 is in line with the auxiliary gas passage 9 and is extended into the auxiliary gas passage to form a gas automatically regulated valve 10 by cutting the shaft to desired cross-sectional profiles, as shown in FIG. 3 and FIG. 5. As shown in FIG. 2, the shaft cross-section is machined as semi-arc shape; whilst in FIG. 4, the shaft is designed as a tube with an aperture 11 on one side wall. The shape of the aperture can be chosen as circular, oval or square to suit different engine performance.

By the same principle, the cross-sectional profile of the lower part of the connecting passage 8 can be designed as various shape as well according to required engine performance curve.

The total gas flow entering the engine comes resultantly from the main gas passage 4 and the auxiliary gas passage 9. The gas passage 4 supplies gas to the engine at all operating conditions, which governs the maximum gas flow depends on the size of the main metering jet 5. The gas flow in the auxiliary gas passage 9 will depend on the throttle valve position which is directly linked to the gas automatically regulated valve 10. The overlap area between the aperture on the gas automatically regulated valve 10 and the lower part of the connecting passage 8 determines the auxiliary gas flow amount. When the throttle valve is rotating, the overlap area will be changing accordingly thus to automatically adjust the auxiliary gas flow. The total gas flow is then adjusted to suit the corresponding engine load. As stated above, both the profile of the lower part of the connecting passage 8 and the shape of the aperture on the regulating valve 10 can be changed according to different applications. The working principle of the gas automatically regulated valve 10 under typical operating conditions can be depicted as below:

1, When the engine is in idle condition, the opening of the throttle valve 7 is in the minimum position, the gas automatically regulated valve 10, which is synchronously rotating with the shaft of throttle valve 7, is fully blocking the auxiliary gaseous passage and no extra gas added into the main gas flow.

2. When engine operates under the partial load, the gas automatically regulated valve 10, which is formed by the shaft of the throttle valve 7 and the lower part of the passage 8, partially opens the auxiliary gas passage 9 to supply certain volume of extra gas flow into the main gas passage 4. As the load of engine increases, the gas automatically regulated valve 10 opens the auxiliary gas passage wider accordingly and some more extra gas will be supplied.

3. When the engine operates under the maximum load, the throttling valve 7 is fully opened, and the gas automatically regulated valve 10 will completely open the auxiliary gas passage 9, thus allow maximum gas supply to the mixer.

The invention claimed is:

1. An automatically regulated gaseous mixer for a small universal gas engine, comprising:
   a mixer body (1);
   a choke valve (2);
   an air inlet port (3);
   a main gas passage (4);
   a main metering jet (5);
   a mixture outlet port (6);
   wherein an air inlet port (3) located on the upper end of the mixer body (1);
   wherein the choke valve (2) is fitted downstream of the air inlet port (3);
   wherein the main gas passage (4) is connected from one side of the mixer body (1), and fitted with the main metering jet (5) to gauge the maximum gas flow into the engine;
   wherein the mixture outlet port (6) is fitted in the lower end of the mixer body (1);
   an auxiliary gas passage (9) is fixed between the main gas passage (4) and the mixture outlet port (6), and is also parallel to the main gas passage (4);
   a connecting passage (8) is vertically fitted between the main passage (4) and the auxiliary gas passage (9);

an upper end of the connecting passage (8) is connected with the main gas passage (4), and a lower end of the connecting passage (8) is connected with the auxiliary gas passage (9);

the auxiliary gas passage (9) is in line with a throttle valve (7), and one end of the auxiliary gas passage (9) is connected with a gas input (12);

at another end of the auxiliary gas passage (9), a shaft of the throttle valve (7) and the lower end of the connecting passage (8) are integrated to form a gas automatically regulated valve (10);

the lower end of the shaft of the throttle valve (7), near the lower end of the connecting passage (8), is cylinder shaped with an aperture (11) on one side wall of cylinder;

wherein an opening of the lower end of the connecting passage (8) is not limited to the shape of round, oval or square.

2. The automatically regulate gaseous mixer according to claim 1, wherein the gas automatically regulated valve (10) is integrated with the shaft of the throttle valve (7).

\* \* \* \* \*